(12) United States Patent
Camelo et al.

(10) Patent No.: US 9,177,058 B2
(45) Date of Patent: Nov. 3, 2015

(54) MULTI-STEP SEARCH RESULT RETRIEVAL

(75) Inventors: Marcelo Camelo, Dee Why (AU);
Aaron Jacobs, Ashfield (AU); Thor Mitchell, McMahons Point (AU);
Benjamin C. Appleton, Summer Hill (AU)

(73) Assignee: Google Inc., Mountain View, CA (US)

( * ) Notice: Subject to any disclaimer, the term of this patent is extended or adjusted under 35 U.S.C. 154(b) by 1180 days.

(21) Appl. No.: 12/949,601

(22) Filed: Nov. 18, 2010

(65) Prior Publication Data

US 2015/0169749 A1    Jun. 18, 2015

(51) Int. Cl.
*G06F 17/30* (2006.01)

(52) U.S. Cl.
CPC ................. *G06F 17/30864* (2013.01)

(58) Field of Classification Search
CPC ................................. G06F 17/30864
USPC ........................................ 707/769
See application file for complete search history.

(56) References Cited

U.S. PATENT DOCUMENTS

| | | | |
|---|---|---|---|
| 7,624,101 B2 * | 11/2009 | Lin et al. ........................... | 1/1 |
| 8,266,682 B2 * | 9/2012 | Lee .................................... | 726/7 |
| 8,413,261 B2 * | 4/2013 | Nemoy et al. .................. | 726/33 |
| 2006/0277201 A1 * | 12/2006 | Dorsett ............................ | 707/10 |
| 2012/0059812 A1 * | 3/2012 | Bliss et al. ..................... | 707/706 |

OTHER PUBLICATIONS

"Google maps," [online], <http://maps.google.com>, retrieved Nov. 18, 2010, 1 page.

* cited by examiner

*Primary Examiner* — Tony Mahmoudi
*Assistant Examiner* — Mohammad Rahman
(74) *Attorney, Agent, or Firm* — Fish & Richardson P.C.

(57) ABSTRACT

A method for providing search results to a user operating a third-party web page includes receiving a search request from the third-party web page. One or more search results may be identified that satisfy the search request. The one or more search results each have identifying information to be presented to a user, as well as substantive content. A unique identifier, such as an opaque token, is associated with each of the search results. The identification of the one or more results is provided to the third-party web page in a pop-up window or a widget. A request for the content for a selected search result of the one or more search results is received. The unique identifier may be used to validate the request, and the content is provided to the user, either directly or through the widget, on the third-party webpage.

21 Claims, 5 Drawing Sheets

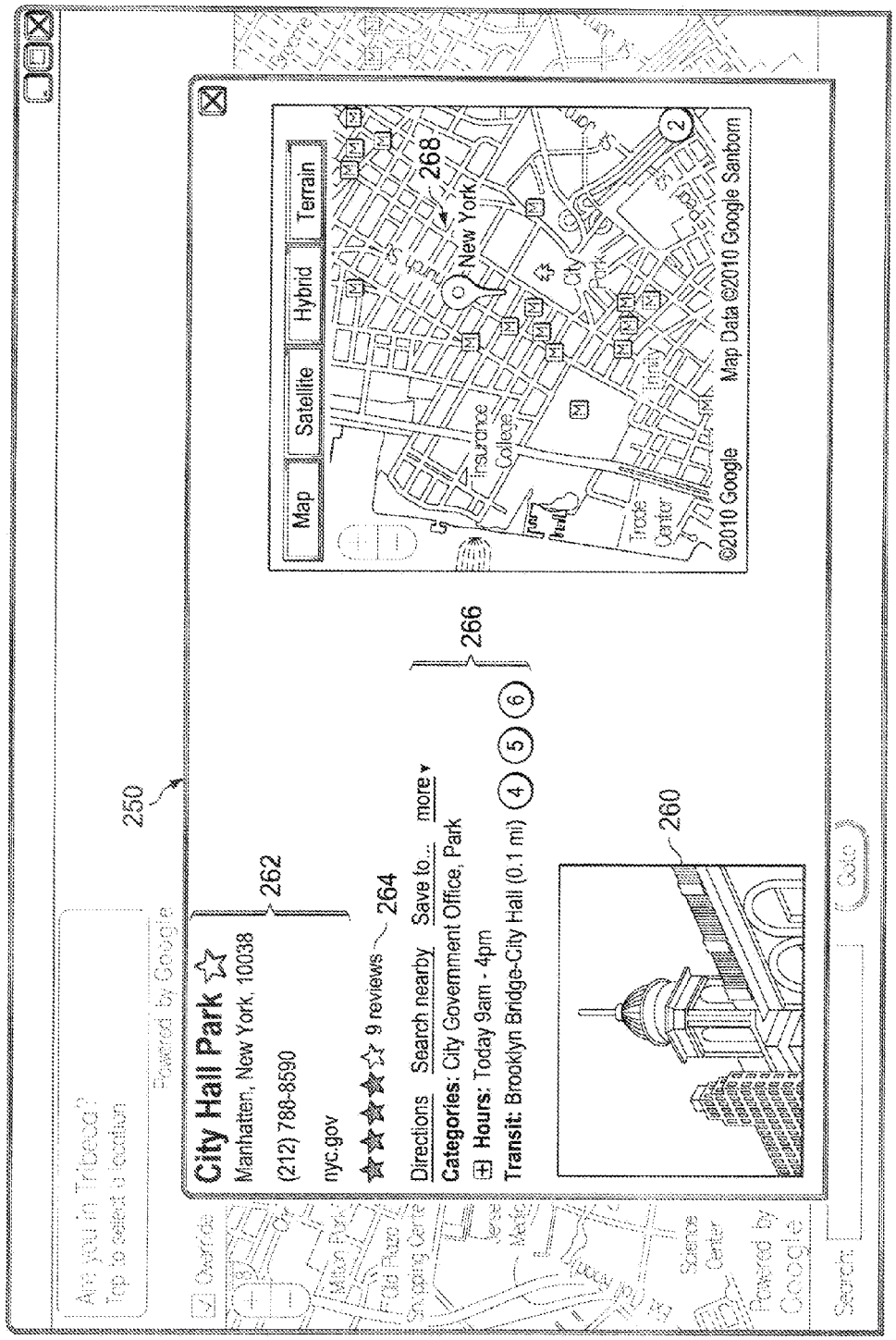

MULTI-STEP SEARCH RESULT RETRIEVAL

TECHNICAL FIELD

This specification describes technologies relating to providing results to queries performed on third-party web pages.

BACKGROUND

Content delivery over the Internet allows computer users to receive search results, location information, e-mail, news, games, entertainment, music, books, and web pages with a simple Internet connection. Internet users also have access to numerous web resources such as maps, images, blogs, local searches, group discussions, and hosted content. Users often access these services to obtain information about a particular place, such as a business, attraction, destination, city or town, entertainment venue, or other point of interest, from web pages hosted by third-party providers that use proprietary search applications or information aggregation services. Web pages can facilitate locating desired information over the Internet, and the content related to a particular topic can, for example, be presented to the user after retrieving the content from such third-party sources.

SUMMARY

This specification describes technologies relating to providing results to queries performed on third-party web pages.

In general, one innovative aspect of the subject matter described in this specification can be embodied in methods that includes the actions of receiving a search request at a host server for a list of results to be presented in a third party provider web document, identifying one or more search results based on the search request, the one or more search results each having an associated plurality of data elements, including one or more first data elements providing human-readable description data for each corresponding search result and one or more second data elements providing content information for each corresponding search result, providing the first data elements of at least a subset of the one or more search results and a unique identifier associated with each of the one or more search results provided, receiving a request for additional data elements for a selected search result of the one or more search results, checking for inclusion of a valid token with the request for additional data elements, and providing one or more of the additional data elements for the selected search result if the request for additional data elements includes a valid token. Other embodiments of this aspect include corresponding systems, apparatus, and computer programs, configured to perform the actions of the methods, encoded on computer storage devices.

These and other embodiments can each optionally include one or more of the following features. For example, in certain implementations of the embodiments, the list of results may be presented on a web site hosted by the third party provider. The search request may be received by an application programming interface hosted on the host server, wherein the application programming interface may be configured to receive search requests from the web site hosted by the third party provider. In some implementations, the human-readable description data for each corresponding search result can include description data that disambiguates between the search results provided in the list. The content information for each corresponding search result may include contact information for an entity associated with the search result.

In some implementations, the unique identifier is an opaque token. The opaque token may be encryptable and decryptable by the host server, and may be generated at each run time of a search, the opaque token being unique between two identical search queries occurring at different instances in time. The unique identifier may have an associated time to live.

In certain instances of the embodiments, receiving a request for content for a selected search result further may include receiving the unique identifier. Certain instances of the embodiments also include identifying the selected search result using the unique identifier.

The search request is a request for a location. Certain instances may further include identifying one or more search results based one the search request includes identifying one or more locations that satisfy the search results, and wherein providing the identification of the one or more search results includes providing a list of names of the one or more locations satisfying the search results.

Certain instances of the embodiments may also include comparing the request for content for a selected search result with a unique identifier associated with the selected search result. Some instances may include populating a database with identification information and content for each of the one or more search results, and accessing the database to provide content for the selected search result.

Certain instances of the embodiments may be implemented as a JavaScript encoded widget on a website in communication with the host server, the widget instantiated on the website based on a user search request and independent of the website implementing the widget.

Certain instances of the embodiments may be coded in a website operated by a third party, the website in communication with an application programming interface on the host server, the application programming interface defining the data types transmitted between the website and the host server and defining a set of rules for the website code including definitions for preventing the third party website from accessing the content for the selected search result.

Particular embodiments of the subject matter described in this specification can be implemented so as to realize one or more of the following advantages. For example, the systems, methods, and articles described herein can be used to create an incentive for the client domain to request more details about a search result, providing click-through rate information for rankings and other analyses, while also preserving lower data rates. Further, the described techniques facilitate the performance of click-through rates analysis. In addition, the hosted data (i.e., data persisting on a search engine server), which may be a high value asset to the host search engine, is protected from the third-party web developer by providing data directly to the client in a module. Click-through rates may also be used as a ranking signal for geographic search results based on how often a search result (such as a geographic search result) is chosen by a user from the set of results presented. The double fetch approach to providing data also facilitates a more efficient throughput of data. Rather than transmitting large amounts of data in a single pipe in response to a search query, a smaller amount of data, such as a listing of location names, can be transmitted. When the user selects a desired location from the list, any part of the entire volume of information associated with that selected location can be transmitted. Thus, data throughput is more efficient. This approach also makes it harder for the developer to scrape the database.

In certain instances, the developer is not provided with the substantive data shown to the user. Rather, the data is streamed directly to the user from the source. In other instances, a widget is provided to the developer as an interface for the user for performing queries. The widget may use a JavaScript coding that prevents the developer from scraping the data and storing it for its own use. Further, the approach described in this specification facilitates a metrics based analysis (e.g., using click-through rates) of the likelihood a particular location will be selected or how interesting certain locations are, etc. In addition, the click-through rate may be tied back to the initial search string to measure and determine the accuracy and precision of the search string and the search performed based on that string. For example, if a user immediately clicks on a given result, the system may determine that the user's search query was successful and can associate the search string used with the location selected.

The use of an opaque token may be used to enhance recall of a specific search result for future searches or other functions without entrusting valuable information to a third party developer. For example, search results may be used to generate an index. Over time, changes in the description of a place (e.g., address, name, telephone number, geolocation) may result in the index of search results evolving and being rebuilt. Thus, performing searches based on so-called hard references may become progressively inaccurate. The opaque token encapsulates a number of attributes and may be resilient to changes in the indexed entity.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 2C is an example screen shot displaying the substantive content of the selected location from the list of search result names on an example place page.

Like reference numbers and designations in the various drawings indicate like elements.

DETAILED DESCRIPTION

Figure 1:
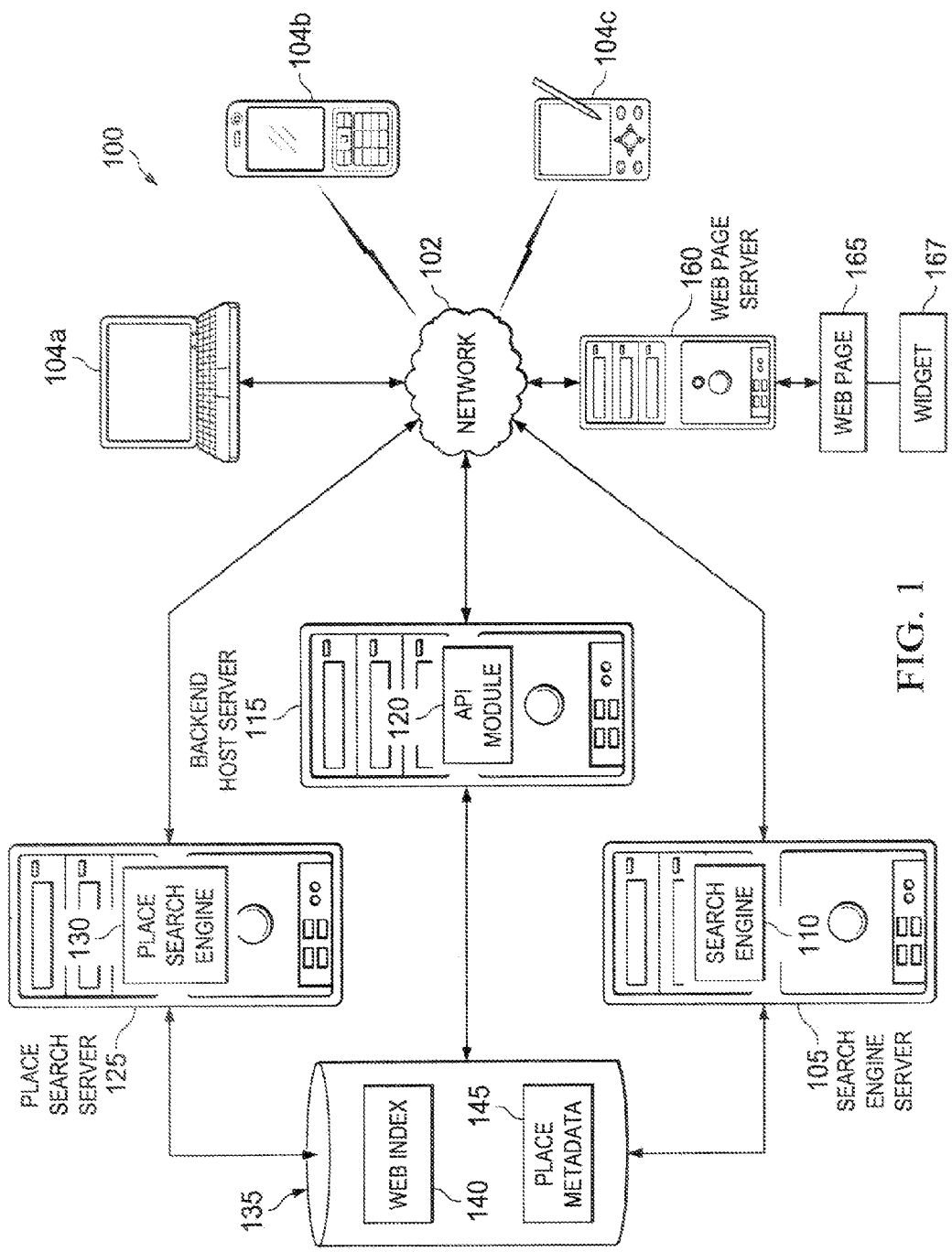
FIG. 1 is a block diagram illustrating a system for providing search results to a user through a third-party web page.

This specification describes systems, methods, and articles directed to providing users with search results across third-party web pages. A user operating a client device may want to perform searches using a web page hosted by a developer. By navigating to a developer's website, the user may download the web document, which may include a scripted interface that permits the user to perform searches, e.g., in the form of textual searches. The web developer may use the scripted interface to communicate with a search service that actually performs the search requested by the user and returns search results to the user across a network through the scripted interface. The scripted interface may communicate directly with the search service for both requesting a search and for returning search results, as opposed to routing the search request and results through the server that hosts the web developer's website. This separation provides a layer of security against the web developer misappropriating the search services proprietary data.

In response to an initial request for search results, the search service may identify a set of results to provide to the user. The search results are returned in a multi-step process. After first receiving a search request, and the subsequent identification of search results, the search service can process the search results to distinguish between a description of the particular result and substantive content. To define a description, the search service may process the search string and any other information available (such as geographic information) to formulate a human-readable descriptor for each search result that unambiguously differentiates them. For example, if the search is for a bar in a certain zip code, the human readable descriptors may include the name of the bar. Similarly, if there are more than one location with the same name, the descriptors may include the name of the bar and a street address, cross street or neighborhood name, etc. An encoded, unique identifier may also be generated during this process and associated with each of the search results. The unique identifiers would not be decipherable by the server hosting the developer's website.

The next stage would be to transmit the descriptions of the search results to the user. The descriptions may be transmitted directly to the scripted interface from the search service. Also, the encoded, unique identifiers are also transmitted. A user could then select one of the search result descriptions in order to receive more content about that search result. By selecting one of the descriptors, the scripted interface would send a second request based on the user's selection to the search service, indicating that the user has selected a particular search result and is seeking more information. The unique identifier may be used to validate the user request, and to permit accurate and efficient retrieval of the content of the selected search result. The unique identifier may be encryptable/decryptable only by the backend server; be unique even between two identical search queries; have a somewhat short Time to Live (TTL) (e.g., of a few minutes); allow the reconstruction of the search query that originated it; and allow the recalling of the result entry that contains it. The content of the selected result is then transmitted from the search service directly to the scripted interface for display to the user.

FIG. 1 is a block diagram illustrating a system 100 for providing search results to a user through a third-party web page. The system 100 includes one or more search engine servers 105, one or more backend host servers 115, and one or more place search servers 125. Although only one of each of the servers 105, 115, and 125 is illustrated in FIG. 1 for convenience, the functionality of the servers 105, 115, and 125 can be distributed among multiple different servers. In addition, the functionality of the different servers 105, 115, and 125 can be implemented in a single server pool. For example, the functions of the backend host server 115 and the place search server 125 can be performed in a single shared server pool. Similarly, the functions of the search engine server 105 can also be performed by the same shared server pool. Throughout the following description, functions described as being performed on a server can be performed on a single server or on multiple servers acting in concert to perform the described functions. Backend host server 115 may act as a communications interface for web page 165 requesting searches. The web page 165 may communicate with API module 120 on backend host server 115 across network 102. Backend host server 115 may then communicate with the place search server 125 for place searches and/or with search engine server 105 for general searches. As mentioned above, Backend host server 115, place search server 125, and search engine server 105 may be a single server, multiple servers, or may exist in a server pool or may exist as other implementations. Backend host server 115 may communicate with search engine server 105 and place search server 125 across network 102 or across a private or internal network. Search engine server 105 and place search server 125 communicate with backend host server 115 across a private network such that data collected is communicated through backend host server 115 before it is transmitted to web page server 160.

The search engine server 105 provides a search engine 110 that can be accessed across a network 102 by client devices 104, e.g., personal computers 104a, mobile phones 104b, personal digital assistants (PDAs) 104c, or other remote devices capable of communicating across the network 102. In certain instances, client devices 104 may perform searches using third-party web pages 165, hosted on third-party webpage server 160. In particular, the search engine server 105 can provide search services for a search interface on third-party web pages 165 accessed across network 102 by client devices 104. The network 102 can include the Internet, one or more local area networks (LANs), one or more wireless networks, or any other network capable of facilitating electronic communications. Client devices 104 may access third party web pages 165 to perform searches. Client devices 104 may download web pages 165 from third party web servers 160 that include webscripts and, in some instances, widget 167. The web page script may be stored on the client device 104 after loading the associated web page, and the web page script may facilitate communication between the client device 104 and the API module 120 on backend host server 115 for performing searches. Users of client devices 104 can submit searches through the web script to the search engine 110 (e.g., the Google™ search engine) by sending search requests across the network 102 to the search engine server 105 through the API module 120. The searches may be submitted through a search interface on the third party web site 165. The search interface can be implemented using a widget 167 or scripts included in the web page 165, and may be loaded onto the client device 104 when it retrieves the web page 165. The search request is sent to the API module 120, and the API module 120 can use or communicate with the search engine server 105 to conduct a search.

The backend host servers 115 can include a API module 120 that communicates with the widget 167 on third-party website 165. In certain instances, users may interact with a widget plugged into third-party web page 165 and enter a search query into the widget displayed on a third-party web page 165. The widget 167 may be run on the third-party website 165 and may initiate a search request by sending the request directly to the API module 120 and bypassing the third-party web server. That is, the request for a search from a user operating client device 104 may trigger execution of the widget 167 to be run on the client device 104 through website 165, which communicates directly with an API module 120 on the host server 115. A widget may be a small, portable application or piece of dynamic content that can easily be placed into a web page or an embedded browser within a rich client. A widget can provide an interaction point for the manipulation of a given kind of data. Widgets can be implemented as building blocks that, combined in an application, hold data processed by the application and the available interactions on these data. Widgets can be written in any language (Java, .NET, PHP, and more) or can be a simple HTML fragment. Widgets may be created with a variety of tools, including Eclipse, IBM WebSphere sMash, or even Notepad. Programs with widget creation environments such as Lotus Mashups, for example, are available for creating and deploying widgets.

The widget 167 may communicate with the backend server 115 through API module 120. API module 120 may receive information, such as search strings, search criteria, GPS coordinates, location data, or other information associated with a search or a selection of a location. The API module 120 may receive information in a standard or predefined format defined in the JavaScript coding associated with the widget 167. The JavaScript coding of the widget may also provide security for the data transmitted across network 102, preventing the third party developer from viewing the search results data.

In certain implementations, the developer may not use a widget on the web page 165. Instead, the developer may code the web page to implement a user interface on the third party web page 165. The user interface may mimic the mechanics of the widget, and communicate information to the API module 120 on the backend host server 115. The coding of the user interface can be used to transmit data to the API module 120 satisfying certain data type definitions, including but not limited to meta data definitions, such that the API module can execute a search protocol. The API module 120 may define the first data or data type needed from the third party web page. For example, the first data may be a search string or other information sufficient to trigger a search. The API module 120 may also provide a definition for the data provided by the host server 115 so the third party developer web page 160 may provide that information to a user in the correct format. For example, a list of descriptors may be provided in a format that permits the user to select one of the results but also prevents the third party developer from scraping the data. The descriptors are established by processing the search results and defining the descriptors so that when they are displayed to the user, each search result is unambiguously identifiable (i.e., the user can understand the differences between seemingly similar results). For example, if the user is looking for the location of a particular store in a certain city, the initial set of search results displayed would need to show more the name of the store. Instead, the initial set of search results could show the name of the store along with a street name or neighborhood or cross street, etc., so that the user can distinguish one result from the next.

The data provided can also include a unique identifier for each search result that may be hidden from the user but associated with the search result such that the unique identifier may be used to validate a selected search result by comparison of the selected search result to the unique identifier. As described further below, a user's selection of a search result can be interpreted as a request for more information about that search result. The API module 120 defines a second data type needed to respond to the user's request. The second data that is transmitted across network 102 in response to the user's request can contain sufficient information to satisfy the user request. In certain instances, the second data may contain more detailed location information, such as addresses, contact information, map data and functionality, directions data and/or functionality, and other information to satisfy the user request. In certain implementations, other information may also be provided, such as ratings information, web links to related sites, photographs, comments, etc. A "more information" link may be provided to guide the user to more detailed data about the search result. The API module 120 may also define a set of rules for the web developer implementation, for example, to ensure implementation of protections for the proprietary information communicated from the backend host server 115 to the client device 104 through the third party web site 165. One such rule may include a definition that the retrieval of the second result is based on user provided inputs.

Figure 2A:
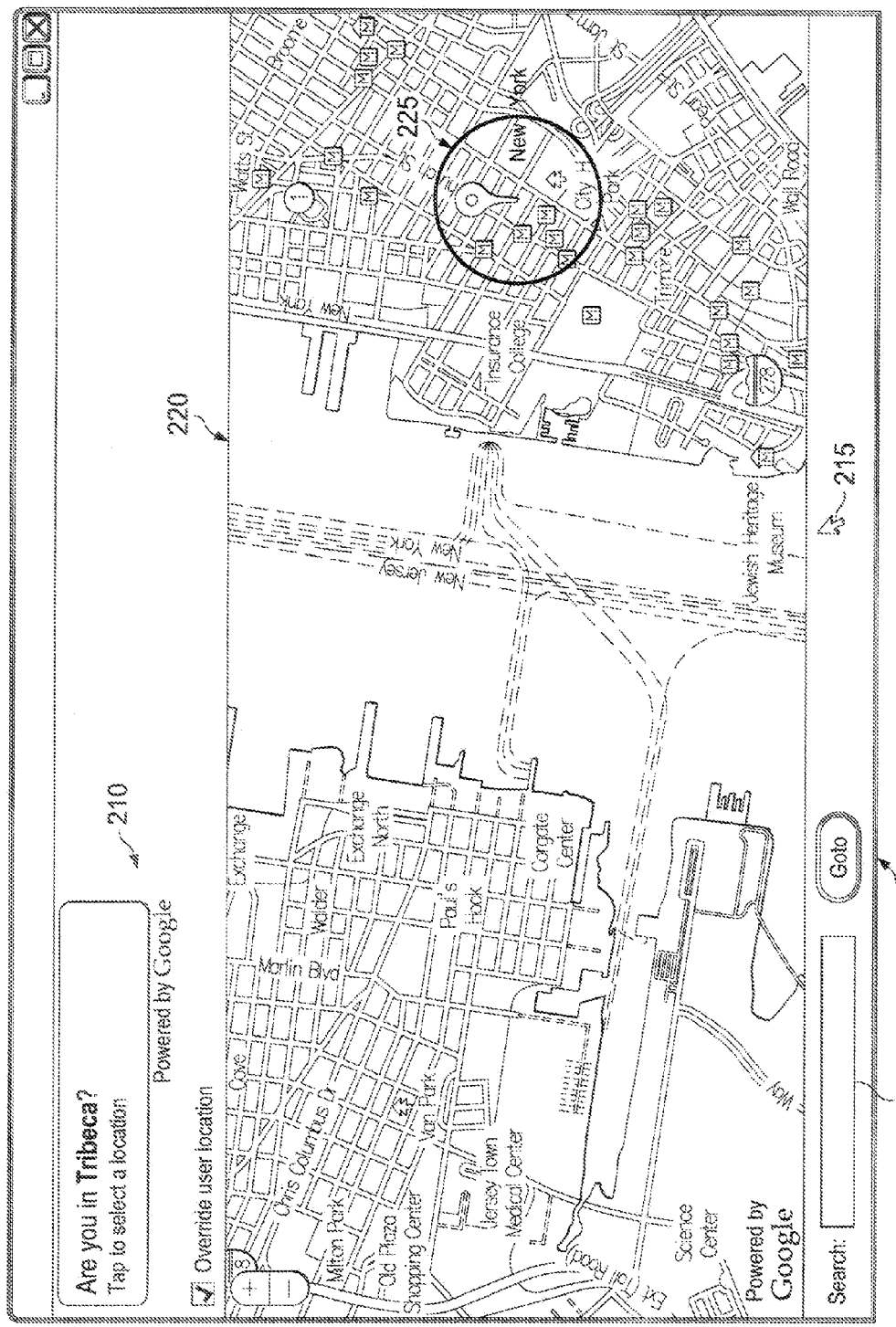
FIG. 2A is an example of a developer site displaying an interface for location searches.

FIG. 2A is an example of a developer site 200 displaying an interface for location searches. A user may interface with the developer site 200 by clicking a mouse pointer 215 or other utility (such as touch screen utility or others described below) on various locations on interactive map 220. Interactive map 220 may be provided to web developer site 200 as a JavaScript implementation of a widget or gadget or other modular interface that the developer may plug into the website 200. The widget may include a search bar 205 for receiving text inputs from a user. The widget may also include an interactive area 210 for permitting a user to select locations near the region of interest 225. Also displayed on the interactive map 220 is a region of interest 225. The region of interest 225 may act as a filter for providing the user a list of locations within that region 225. In the example provided in FIG. 2A, the region of interest includes locations such as City Hall Park and other locations within the circle indicating the region 225. In certain instances, the interactive map 220 may be provided in a widget by a host search engine. In other instances, the interactive map 220 may be local to the developer site and may use a host search engine to perform location searches. FIG. 2A shows an implementation for location searches, but similar implementations may be used for other types of searches.

As further illustrated in FIG. 1, in response to such search requests, the search engine 110 accesses one or more databases 135 that store one or more web indexes 140 to generate a set or list of search results. The web indexes 140 typically store large amounts of information about web page contents provided by numerous third-party web servers. Typically, web page data is extracted from the web servers through automated web crawlers that periodically crawl the web to identify, analyze, and index web page contents. In some cases, the web indexes 140 may also include data that is manually entered into the databases 135. Data mined from the web is a valuable resource for the owner of the data, and the owner may need to take steps to prevent web developers from obtaining the data. Instead of simply providing the data to users requesting the data from third-party developers' sites, the web developer can show a list of search results that have minimal data to the developer. For example, a user (e.g., user running client device 104) may initiate a query on a third-party web page 165 for a location. The user may interface with the third-party web pages 165 using a widget, gadget, or other interface module that may be coded into the web page 165 according to rules set by the API module 120.

The search may be initiated as a textual search. In certain instances, the search may be a location search. Location searches may be requested based on textual entries, or by other ways. For example, photographs having metadata describing location information may trigger a location query. A photograph may include metadata or other descriptive data such as GPS locations or general locations. When the developer initiates the query, what is returned is a list of search results to provide to the user, the list including an identification of the search results that identifies the search results. Descriptors may include a name, and possibly street name or city name, or any descriptive information permitting identification of the search result.

In addition to the unambiguous descriptors, which are displayed and communicate to a user what the results are, a unique identifier for each search result may also be delivered for each of the search results. In certain instances, the unique identifier is hidden from the user, and may be an encoded and/or opaque token. The unique identifier can be used by the backend host server 115 to identify the particular result, and also retrieve additional data about the result in a quick and efficient manner. The unique identifier may also permit the backend host server 115 to match the search request the associated result is responsive to. In addition, the unique identifier may allow the backend host server 115 to associate a particular requesting party with the request and with the corresponding search results, as well as other information. As such, the unique identifier may be used for click-through rate analysis.

For example, an opaque token may be associated with each of the results in the list. The token is opaque in the sense that the web developer is unable to reconstruct the token security information as generated by the backend host server 115, but is able to accept it and pass it back to the backend host server 115. The opaque token allows the system to robustly authenticate the user's selected search result to the backend host sever 115. The security information established at the server is typically based on generation of random numbers and cryptography. That is, in one embodiment the token is generated using a random number as the clear text, and then the random number is encrypted to provide part of the token. The user can identify the correct search result based on the listing, and then can ask for the details. In certain instances, a set or list of search results is generated based on the search query. The results may include an descriptor and substantive content. The substantive content may be any content available for the search result, including an address, vicinity, ratings, reviews, photographs, related web pages, directions, menus, GPS coordinates, metadata, or other substantive information. A list of descriptors may be assembled that is absent the substantive content. Such a list would include descriptors such as names of locations and corresponding unique identifiers.

In some implementations, the search engine 110 may include a map search function that allows searching for particular places on a map (e.g., by searching in a city or other wider geographical area, or by searching near a current location or other specific location). The search results can be shown on a map in the widget, and the search results for each place can include a link to a place page. Widgets may be provided to third-party developer websites that provide mapping and searching capabilities to a client using a client device 104. The widget may display map information and permit a user to enter search queries.

The data stored in the one or more databases 135 can include term metadata that identifies, for each place and/or type of place, terms that are predetermined as being of particular interest for the type of place. For example, terms such as "service," "rooms," "value," "dining," and "location" might be of particular interest for hotels, generally and individual hotels might have other terms of specific interest based on their unique features (e.g., "oceanview," "spa," or the name of the hotel's restaurant). Such terms can be used as suggested search terms for searching within the set of data that relates to the particular place.

The API module 120 may communicate with a JavaScript implementation of a widget or gadget or other interface that developers can plug into a website. In certain implementations, the API module 120 can communicate with developer implementations of web script coding appropriately coded to interact with the API module 120. The API module 120 can receive data from a user interface component (e.g., a text search box for submitting a textual search request or hyperlinks to suggested search queries) that allows a user to submit a search request for data.

Figure 2B:
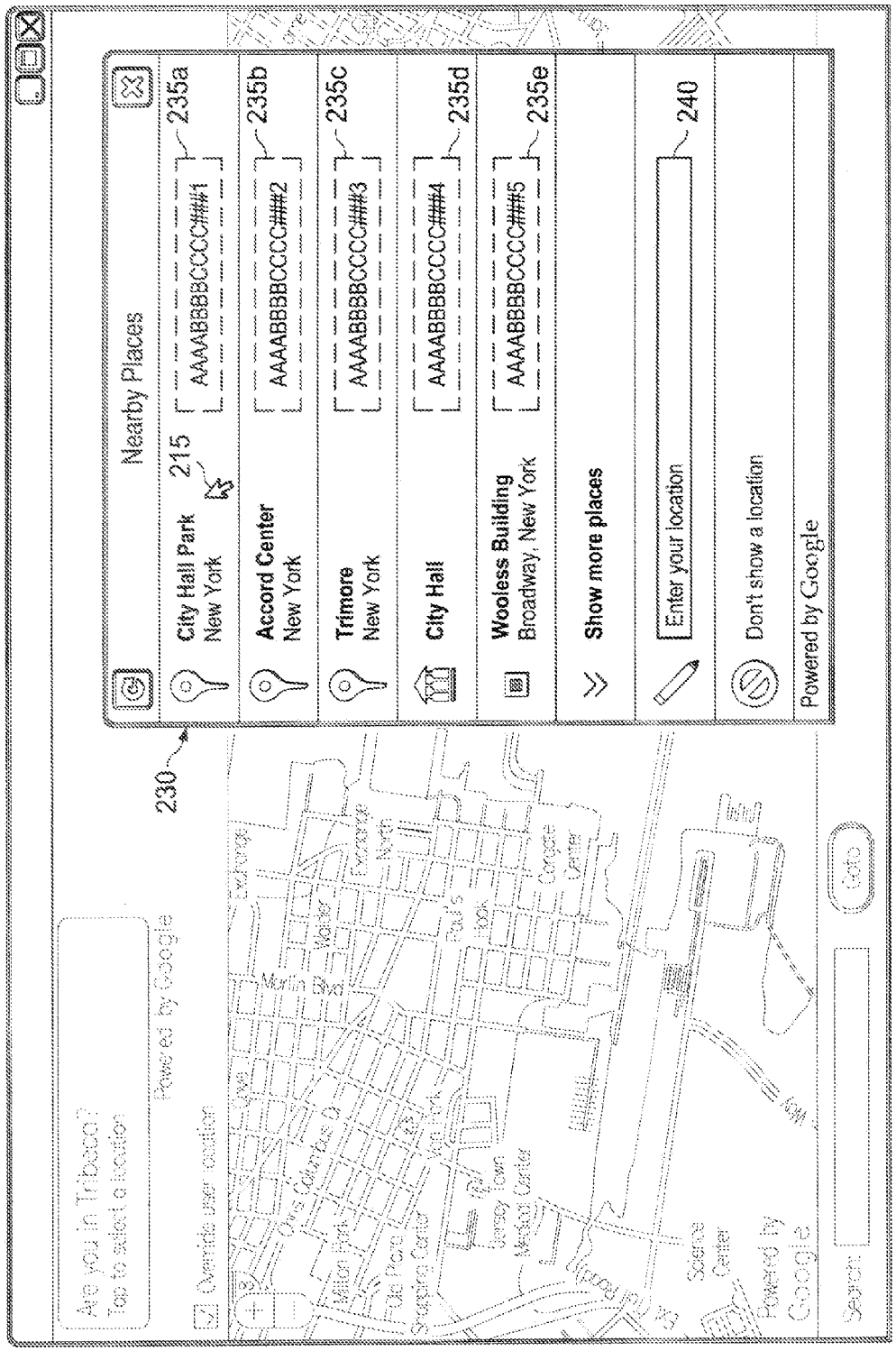
FIG. 2B is an example screenshot of a widget displayed on the developer site providing a list of search result names.

By submitting a search request through the widget's search component, the API module 120 on backend host server 115 can send the submitted search request to one or more place search servers 125. The place search servers 125 include a place search engine 130 for conducting a search within the data associated with the particular place. The place search engine 130 can thus identify information responsive to the search request by conducting a search within web index 140 identified by the cluster data 150. In some implementations, the place search engine 130 can be implemented as the search engine 110 where the search is limited to web index 140 that is identified as being related to the particular place. The results of the search within the particular place can be presented in a place search results page. The place search results page includes a list of descriptors that provide sufficient information for a user to distinguish between similar results in the list. FIG. 2B shows an example place search page. The page may be presented as a pop-up window in the third party webpage 165 or may be presented in widget 167.

FIG. 2B is an example screenshot of a widget displayed on the developer site providing a list of search result names. In the example shown in FIG. 2B, the widget 230 may be an interactive pop-up window listing names and corresponding cities for certain locations. In this example, the list includes "City Hall Park, N.Y.," "Civic Center, New York," "Tribeca, N.Y.," "City Hall," and "Woolworth Building." The widget also provides an optional drop-down for expanding the region to show more places to the user, such as places near the region of interest 225. The listing shown does not provide substantive content about the location; rather, the list provides an descriptor for a user to select a desired location (e.g., using mouse pointer 215). Widget 230 also includes an interactive region 240 for entering location information, such as the user's present location. Such information may be used to develop direction and/or distance information upon selecting a desired location. The user can identify the correct search result based on the listing, and then can ask for the details. (name, and possibly street name or city name). In the particular example of FIG. 2B, a user may select "City Hall Park" using mouse pointer 215.

As mentioned above, in the listing of search results, substantive content is not yet delivered to the user. In addition to the descriptors (in FIG. 2B, name and city), a unique identifier for each search result may also be delivered. In FIG. 2B, descriptors 235*a-e* are associated with each location in the list, but it is to be understood that in certain implementations, the unique identifiers are not displayed to the user. In the example of FIG. 2B, unique identifier (briefly, UI) 235*a* is associated with "City Hall Park"; UI 235*b* is associated with "Civic Center"; UI 235*c* is associated with "Tribeca"; UI 235*d* is associated with "City Hall"; and UI 235*e* is associated with Woolworth Building." Unique identifiers may be alphanumeric, hexadecimal, binary, or other combination of values or other identifier that may be processed by a host to determine the associated location.

As mentioned above, the widget 230 may be a JavaScript implementation interface that the third-party developers can plug into their website. The JavaScript coding may prevent the developer from accessing the data provided by the host search engine, such as the location information provided either in the list of descriptors or in the full display of substantive content for the selected location. In other implementations, the widgets may be coded by a developer. In such instances, the API module mechanics would be governed by a set of rules provided by the host search engine. The application programming interface for the coded widget 230 would define the data types needed, and would be governed by rules pertaining to, for example, security of the data and other implementation rules. An example rule may be that the second result providing substantive content to the user may only be transmitted based on user provided input. Other such rules may be used depending on the implementations.

A user may select one of the search results from the widget 230 to receive the substantive content of that result. The backend host server 115 shown in FIG. 1, for example, may receive an indication that the user has selected a particular result and wants to view more information. The indication may be in the form of the opaque token or other mechanisms of communicating that information. The opaque token, in particular, may provide a secure way to facilitate validation that the indication of a selection of a search result is legitimate while also protecting the information from scraping by the developer. Further, the opaque token, being a unique identifier associated with the search result on the backend, would facilitate efficient recovery of the substantive content associated with the selected search result. Upon validation, the backend host server 115 may recover the substantive content, possibly stored in memory 135, and provide the content to the user. The content may be provided as a place page or other compatible interface in the widget running on the third-party web page. In certain embodiments, a new window may be opened to display the place page as a stand-alone web page. Other implementations of providing the substantive content to the user are also contemplated.

For at least some search requests, the search results may include information about a particular place or entity, e.g., a business, a point of interest, a town or city, an attraction, a shopping center, a company, or a geographical location. For example, in response to a search request for a particular hotel, the search results may include web pages that provide information about the particular hotel, e.g., a web page sponsored by the hotel, web pages that provide booking services for the hotel, web pages that provide reviews of the hotel, a map of the hotel location, or other resources associated with the hotel. In addition to individual web pages that are hosted by web servers, the one or more backend host servers 115 host place pages that include information extracted from multiple different third-party web pages, e.g., web servers. The backend host servers 115 generate place pages that include information about a particular place or entity for serving to the remote devices 104. For example, a place page for a particular place can include detailed information about the particular place (e.g., address, phone number, hours, web address, or other details), a map showing the location of the place, reviews of the place, user content related to the place, photos of the place, information about nearby attractions or other places, or any other type of information. In addition, unique identifiers, such as opaque tokens, may be associated with search results. For example, each search result may be assigned an opaque token that persists with the search result, or that is assigned during runtime having a predefined time to live. The token may be associated with the search result such that the token is sent with the search result data across the network 102 when providing the user a list of search result names and when receiving a selected search result back from the user. The opaque token may be encryptable/decryptable only by the search service. Furthermore, the opaque token may be unique even between two identical search queries. For example, the opaque token may be generated at runtime specifically for an identified result to a real-time search query. The opaque token may have a Time to Live (TTL) on the order of minutes, establishing a maximum lifetime of the search results list. This TTL would permit an actual user sufficient time to select a desired search result, but insufficient time for a web developer to misappropriate the host's proprietary data. In addition, the nature of the opaque token would allow the reconstruction of the search query that originated the token, and allow the recalling of the result entry that contains the token.

A page for each place defined in metadata 145 that is stored in one or more databases 135 may be displayed to a user using the widget. The metadata 145 can include lists of places that are identified based on automated analyses of web data (e.g., in the web indexes) and/or user behavior when interacting with the search engine 110, or that are identified based on manually entered data. The information included on each page can be selected from data that identifies associations between each place identified in the place metadata 145 and elements (e.g., web pages, snippets, metadata) of the webpage data and/or the data included in the web index 140. The page can also be organized according to category data stored in one or more databases 135. The category data can define categories of information to be included on the place page according to the particular place or according to the type of place (e.g., such that places of a particular type include the same categories on their respective place pages). For example, for a hotel, the categories may include business details, reviews, a map, photos, and other nearby places. Moreover, the web index 140, the place metadata 145, the category data can include information identifying associations between the elements of the web data and the categories.

FIG. 2C is an example screen shot displaying the substantive content of the selected location from the list of search result names on an example place page 200. The selected result page 250 provides information about a particular place (e.g., City Hall Park in New York). The selected result page 250 may include sufficient information to satisfy the user's search request. In the example of FIG. 2C, the selected result page 250 includes various sections that provide information about the place, including business contact and location information 262, business details 266 (e.g., hours, restaurant category, etc.), review snippets 264, photos 260, and a map 268 showing the location of the place. Other categories of information can be presented in additional sections, e.g., snippets from reviews broken down by subcategories (e.g., service, food, atmosphere, etc.), links to and/or snippets from critic reviews, links to and/or additional information about nearby places, links to web pages that provide more information about the place, and links to user content related to the place, direction, hours of operation, web addresses, nearby locations, etc.

Figure 3:
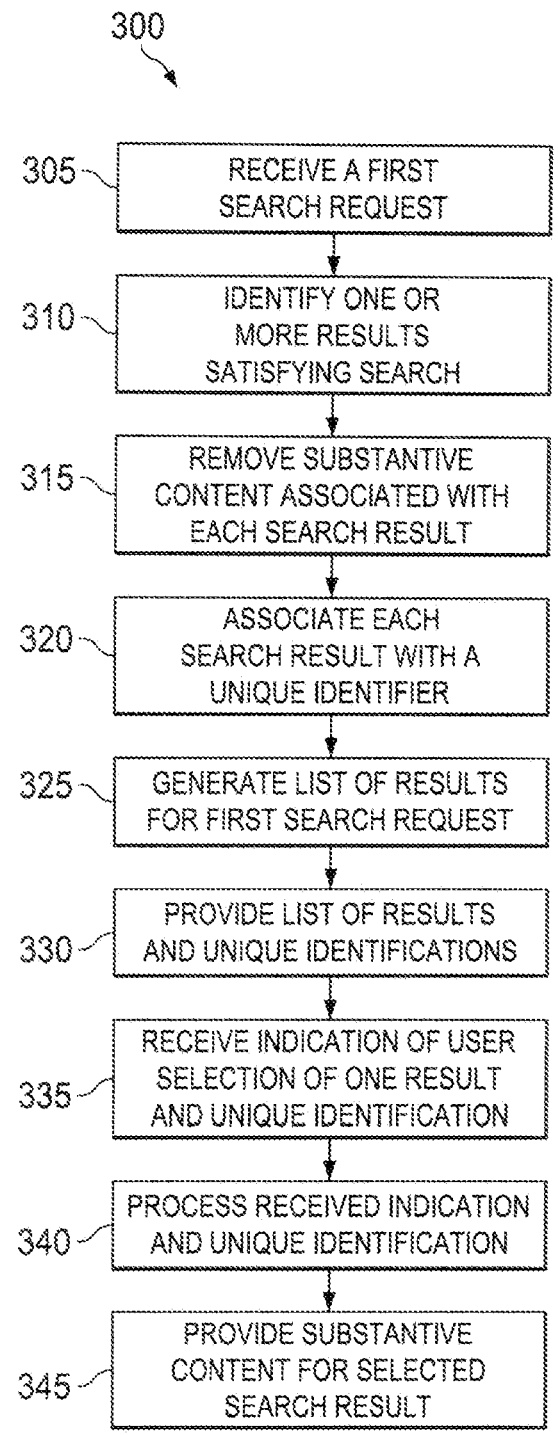
FIG. 3 is a flowchart illustrating a process for providing search results to a user over a third-party web page.

FIG. 3 is a flowchart 300 illustrating a process for providing search results to a user over a third-party web page. A developer web page may include a JavaScript implementation of a widget that permits user interaction; specifically, the widget permits the user to perform searches for, among other things, locations. After a user provides a request for a location, that request is transmitted to the host search engine for processing (305). The user can provide the search request actively by entering a textual search. In certain implementations, the user can trigger a search for locations by performing an action. For example, the user may upload a photograph with location metadata. The widget may prompt the backend to perform a search for locations proximate to the location metadata associated with the photograph. In such an example, the photograph may include GPS information or general location information. The system may provide a list of locations that the user may select from, such as the restaurant where the photograph was taken, or the monument that is the subject of the photograph. Other implementations are similarly contemplated.

Upon receiving a request for a search for a location, the system may identify one or more search results that satisfy the search criteria (310). The search results may include a name and other identification information, as well as substantive content. A list of the search results is assembled that includes only the name and/or the other identification information (325). In certain implementations, a database of search results may be compiled that includes both the name and the substantive content of the search results. The database may be associated with the search request. The substantive content for each of the search results may be stripped from the database (315). A unique identifier may be associated with each of the search results (320). The unique identifier may be an opaque token or other unique identifier. The list of names may be transmitted across a network to the widget on the third-party web site (330). The widget is JavaScript coded such that the developer cannot extract data from the list in order to bypass requesting data from the host search engine. The list of names is displayed to the user as, for example, selectable links. The user may select the specific location by clicking on the name or by using other manipulation features available to the client device used. In certain instances, the unique identifiers may also be transmitted with the list of search results. The unique identifiers may be hidden from the user, though associated with the items on the results list. The user selection of one of the search results establishes an indication that the user wants more information about that search result. An indication of the search result is transmitted to the host for processing (335). The host may process the indication by comparing the unique identifier associated with the indicated search result. A match indicates that the indication is a legitimate request for information. Upon validating the request, the substantive content of the selected search result is provided to the user (345).

In certain implementations, the system may keep track of the ratio between the search results identified for the second search request and the first search request. In particular instances, the ratio should be less than or equal to one. In such instances, the maximum ratio would be 1:1 (i.e., one request for substantive content of one provided search result name). A ratio of greater than one could be used as a misuse indication. For example, the third-party developer may be attempting to retrieve data for its own purposes. Because the initial search results are organized in a listing of unambiguous descriptors, the user would be able to identify the desired location within the time to live of the opaque token without having to click or select multiple search results. The aforementioned implementation can be coded into the JavaScript of the widget. Other implementations may also be used that permit user errors, for example, that may require a user to hit a "back" button to reconsider the location options. In such instances, the "back" button may prompt the host server to reinitialize the list of search results and provide a new set of unique identifiers for each one, facilitating security of the information, despite the user error.

Listing relevant search results, such as geographic search results given a geographic region, may involve ranking candidates based on likelihood of each search result being the one the user is interested in. Because of how they reflect user interest, click-through rate analysis has been used to rank web pages and other online content. Within the context of cross-domain services, however, keeping track of click-through rates is a challenge. For example, the client domain may not be obligated to report clicks back to the host search service. In addition, click-reporting interfaces are prone to be abused by agents trying to game the system or misuse proprietary data. The systems, methods, and articles of the present specification create an incentive for the client domain to report clicks back to the search service by only presenting limited information to the user in an initial set of search results. The present system also uses encryption and authentication mechanisms, such as opaque tokens, that facilitate fraud prevention by using opaque tokens with characteristics, such as limited time to live, and other characteristics described above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory, or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user, as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. A user may access search services according to the present disclosures from a desktop or laptop or other similar devices; likewise, a user may access search services accordingly from a mobile phone, PDA, BlackBerry or other smartphone, iPhone, or other device using, for example, a native programming language such as Java, Objective-C, or C++. Other devices may also be used, such as on-board navigation systems in automobiles.

What is claimed is:

1. A method comprising:
   receiving a search request from a user interface provided by a third party;
   identifying one or more search results based on the search request, each search result of the one or more search results having an associated plurality of data elements;
   processing the one or more search results to distinguish, for each search result, between one or more first data elements providing human-readable description data as a search result descriptor and one or more second data elements providing content information;
   associating a unique identifier with each search result of the one or more search results, the unique identifier comprising an opaque token preventing access to the search result descriptor by the third party;
   sending instructions causing display of the search result descriptor and associated unique identifier of each search result of at least a subset of the one or more search results in a user interface provided by the third party on a display device;
   receiving a request for additional data elements for a search result from a user interface provided by the third party, the search result corresponding to a selected search result descriptor, and the request including the unique identifier corresponding to the selected search result descriptor;
   checking for inclusion of the unique identifier with the request for additional data elements; and
   sending instructions causing display of one or more of the second data elements for the search result in a user interface provided by the third party, the search result corresponding to the selected search result descriptor and the unique identifier included with the request for additional data elements matching the unique identifier associated with the search result corresponding to the selected search result descriptor.

2. The method of claim 1, wherein the provided one or more second data elements are presented on a web site hosted by the third party.

3. The method of claim 1, wherein the search request is received by an application programming interface, the application programming interface configured to receive search requests from a web site hosted by the third party.

4. The method of claim 1, wherein the human-readable description data for each corresponding search result includes description data that disambiguates between the search results.

5. The method of claim 1, wherein the content information for each corresponding search result includes contact information for an entity associated with the search result.

6. The method of claim 1, wherein the unique identifier is encryptable and decryptable by the user interface, the opaque token generated at each run time of a search, the unique identifier being unique between two identical search queries occurring at different instances in time.

7. The method of claim 1, wherein the unique identifier has an associated time to live.

8. The method of claim 1, further comprising identifying a selected search result using the unique identifier included in the request for additional data elements.

9. The method of claim 1, wherein the search request is a request for one or more locations.

10. The method of claim 9, wherein identifying one or more search results based one the search request includes identifying one or more locations that satisfy the search results; and
   wherein providing the identification of the one or more search results includes providing a list of names of the one or more locations satisfying the search results.

11. The method of claim 1 further comprising populating a database with identification information and content for each of the one or more search results, and accessing the database to provide content for the selected search result.

12. A system comprising:
a memory; and
at least one processor coupled to the memory and operable to:
receive a search request from a user interface provided by a third party;
identify one or more search results based on the search request, each search result of the one or more search results having an associated plurality of data elements;
process the one or more search results to distinguish, for each search result, between one or more first data elements providing human-readable description data as a search result descriptor and one or more second data elements providing content information;
associate a unique identifier with each search result of the one or more search results, the unique identifier comprising an opaque token preventing access to the search result descriptor by the third party;
send instructions causing display of the search result descriptor and associated unique identifier of each search result of at least a subset of the one or more search results in a user interface provided by the third party on a display device;
receive from the scripted interface a request for additional data elements for a search result from a user interface provided by the third party, the search result corresponding to a selected search result descriptor, and the request including the unique identifier corresponding to the selected search result descriptor;
check for inclusion of the unique identifier with the request for additional data elements, and
send instructions causing display of one or more of the second data elements for the search result in a user interface provided by the third party, the search result corresponding to the selected search result descriptor and the unique identifier included with the request for additional data elements matching the unique identifier associated with the search result corresponding to the selected search result descriptor.

13. The system of claim 12, wherein the search request is received by an application programming interface, the application programming interface configured to receive search requests from a web site hosted by the third party.

14. The system of claim 12, wherein the human-readable description data for each corresponding search result includes description data that disambiguates between the search results.

15. The system of claim 12, wherein the unique identifier is encryptable and decryptable by the user interface, the opaque token generated at each run time of a search, the unique identifier being unique between two identical search queries occurring at different instances in time.

16. An article tangibly embodied on a non-transitory computer-readable medium, encoded by a computer, comprising computer-readable instructions that when executed by a processor are operable to:
receive a search request from a user interface provided by a third party;
identifying one or more search results based on the search request, each search result of the one or more search results having an associated plurality of data elements;
process the one or more search results to distinguish, for each search result, between one or more first data elements providing human-readable description data as a search result descriptor and one or more second data elements providing content information;
associate a unique identifier with each search result of the one or more search results, the unique identifier comprising an opaque token preventing access to the search result descriptor by the third party;
send instructions causing display of the search result descriptor and associated unique identifier of each search result of at least a subset of the one or more search results in a user interface provided by the third party on a display device;
receive from a user interface provided by the third party a request for additional data elements for a search result from the user interface, the search result corresponding to a selected search result descriptor, and the request including the unique identifier corresponding to the selected search result descriptor;
check for inclusion of the unique identifier with the request for additional data elements, and
send instructions causing display of one or more of the second data elements for the search result in a user interface provided by the third party, the search result corresponding to the selected search result descriptor and the unique identifier included with the request for additional data elements matching the unique identifier associated with the search result corresponding to the selected search result descriptor.

17. The article of claim 16 implemented as a JavaScript encoded widget on a website, the widget instantiated on the website based on the search request and independent of the website implementing the widget.

18. The article of claim 16 coded in a website operated by the third party, the website in communication with an application programming interface defining data types transmitted and defining a set of rules for website code including definitions for preventing the website from accessing the content information for the selected search result.

19. The method of claim 1, wherein the opaque token prevents reconstruction by the third party of security information associated with the unique identifier.

20. The system of claim 12, wherein the opaque token prevents reconstruction by the third party of security information associated with the unique identifier.

21. The article of claim 16, wherein the opaque token prevents reconstruction by the third party of security information associated with the unique identifier.

* * * * *